United States Patent Office 3,381,044
Patented Apr. 30, 1968

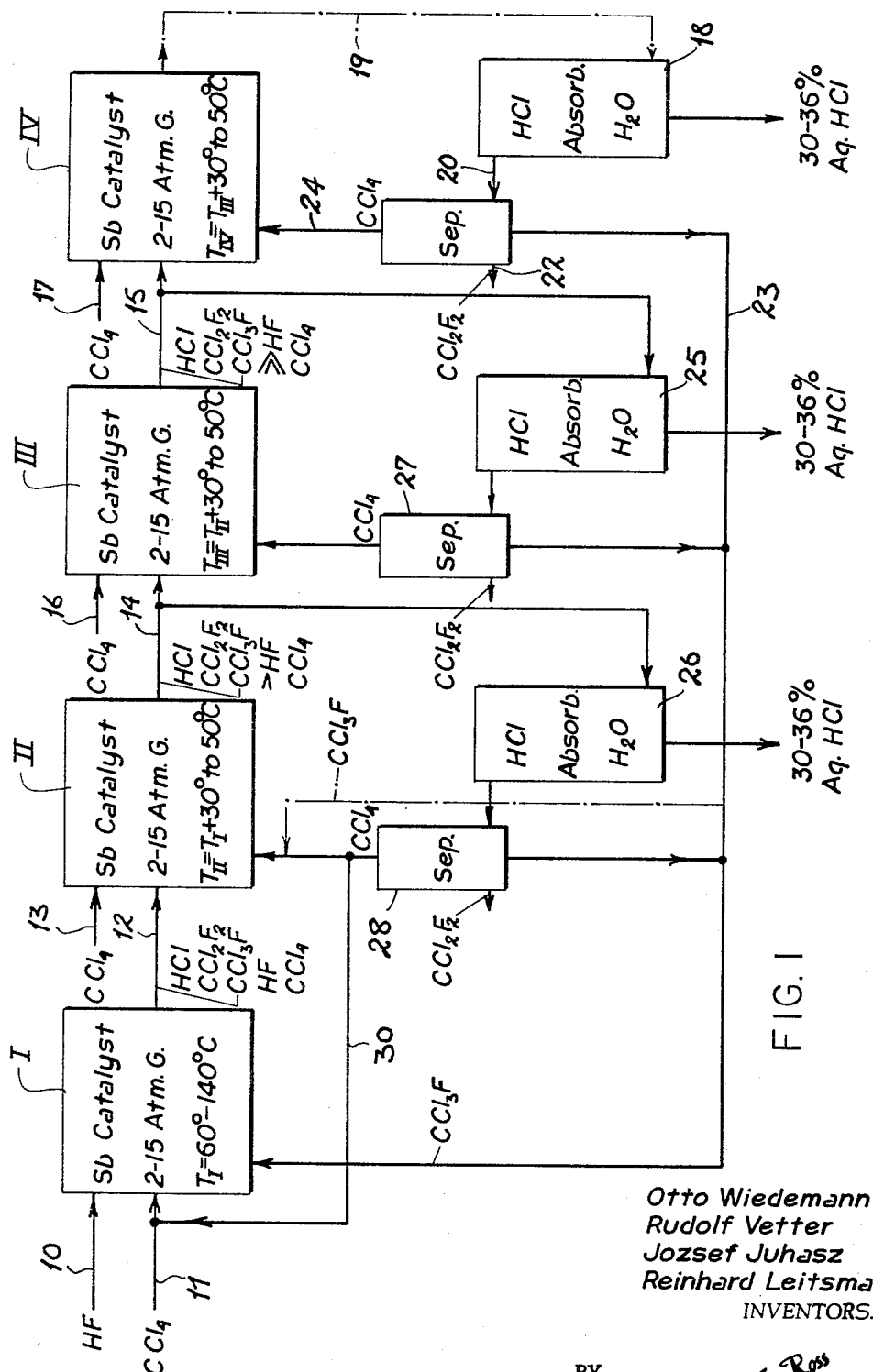

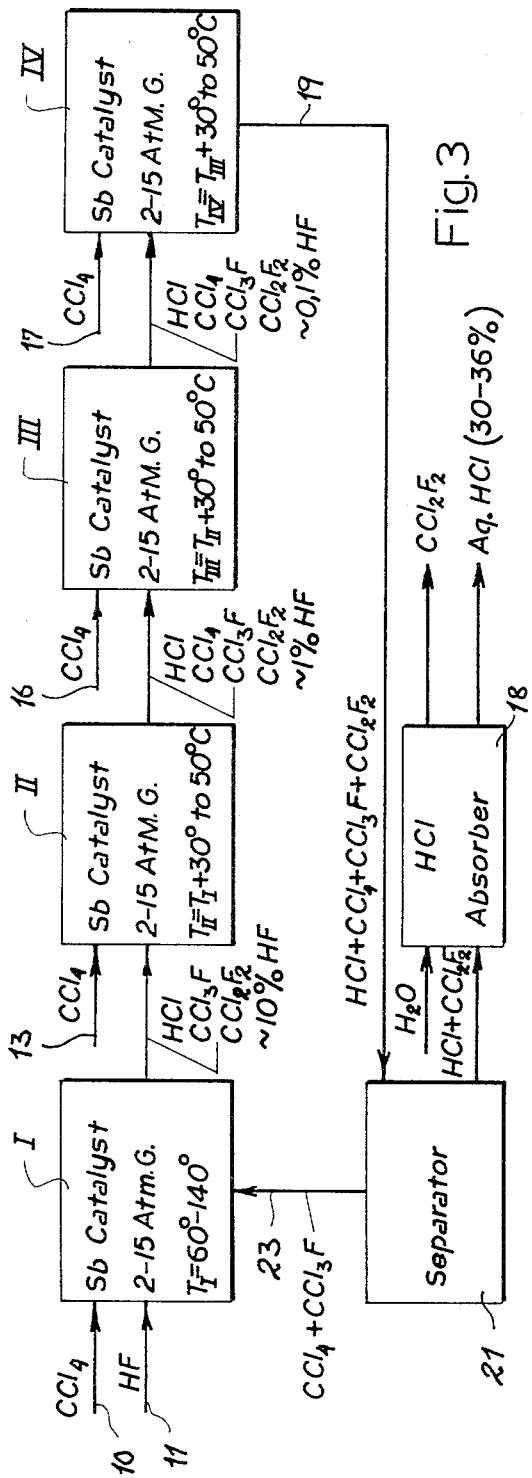
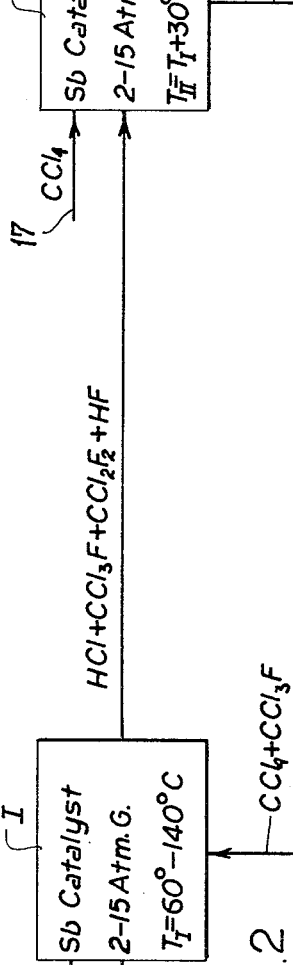
Fig. 3
Fig. 2
Otto Wiedemann
Rudolf Vetter
Jozsef Juhasz
Reinhard Leitsmann
INVENTORS.

3,381,044
PROCESS FOR THE PRODUCTION OF SUBSTITUTION-FLUORINATED HYDROCARBONS FROM CHLORINATED HYDROCARBONS
Otto Wiedemann, Munich-Geiselgasteig and Reinhard Leitsmann, Jozsef Juhász, and Rudolf Vetter, Regensburg, Germany, assignors to Chemische Fabrik von Heyden Aktiengesellschaft, Munich, Germany, a stock corporation of Germany
Filed Nov. 12, 1964, Ser. No. 440,337
Claims priority, application Germany, Nov. 13, 1963, C 31,398
7 Claims. (Cl. 260—653.7)

Our present invention relates to an improved process for the fluorination of the lower aliphatic halogenated hydrocarbons and catalyzed displacement of the chemically bound halogen by fluorine from hydrogen fluoride to produce mono- or polyfluorinated hydrocarbons having one or more fluorine atoms and hydrochloric acid.

This displacement or substitution reaction has achieved some commercial success in the production of chlorofluoro-hydrocarbons and especially the polyfluoro-hydrocarbons resulting from the treatment of mono- or polychlorinated aliphatic compounds with hydrogen fluoride in the presence of a fluorination catalyst. The economic utility of this reaction is, however, sharply limited by the fact that the reaction can seldom be brought to completion with full utilization of all of the available hydrogen fluoride unless a considerable excess of the chlorinated or other halogenated hydrocarbon is initially used. The latter practice is, in itself, disadvantageous since dilution of the hydrogen fluoride in this manner results in a decreased reaction rate and efficiency. It has been found that mere increasing of the amount of catalyst available per unit of halogenated hydrocarbon also does not ensure a complete utilization of the hydrogen fluoride but only increases the cost of the material and the process. It is, consequently, a significant problem in the commercial realization of substitution fluorination by displacement of chlorine or other halogen from the aliphatic compound with fluorine that the end product, i.e., the mono- or polyfluorinated hydrocarbon, is obtained contaminated with considerable quantities of hydrogen fluoride.

The presence of this impurity, especially in large quantities, renders the fluorochloro-hydrocarbon unsatisfactory for most of its conventional applications unless the product is subjected first to a removal of the hydrogen fluoride. Moreover, mere washing of the effluent gases removes both the hydrogen fluoride and the hydrogen chloride whose recovery in a relatively concentrated form is essential for the economic success of the process. The absorption of hydrogen chloride in water to yield commercially acceptable hydrochloric acid at a concentration of 30–36% (by weight) is precluded by the presence of hydrogen fluoride which acts as a contaminant of the hydrochloric acid and prevents its widespread use for conventional purposes. Most processes designed to remove this impurity have, therefore, been carried out directly upon the effluent gases of the reaction. Some of these separation techniques may be mentioned to demonstrate the scope of the problem and the many facets of the solutions proposed heretofore: In one of these techniques, the effluent reaction gases are subjected to liquefaction with repeated fractional distillation and removal of hydrogen fluoride by virtue of its solubility in water (U.S. Patents No. 2,450,414, 2,450,415, and 2,478,-362). According to another separation technique a solubility displacement of hydrogen fluoride is effected from the liquefied reaction product by contrast with the gaseous separation described above (see U.S. Patent No. 2,640,-086). Other systems for the removal of hydrogen fluoride have involved the countercurrent washing of the reaction gases with aqueous solutions of hydrochloric acid and hydrofluoric acid (see German printed application—Auslegeschrift—No. 1,036,826 and U.S. Patent No. 2,690,815); the countercurrent washing of the reaction gases with sulfuric acid (United Kingdom Patent Specification No. 792,927); and the use of ion-exchange principles (U.S. Patent No. 2,829,028). Some proposals for the removal of fluoride from the hydrochloric acid resulting from the washing of the effluent reaction gases have also been made. These latter techniques involve the precipitation of fluoride ion compounds such as aluminum trifluoride, calcium difluoride and sodium fluosilicate (German Patent No. 1,652,962 and French Patent No. 1,129,026).

It will thus be readily apparent that the art recognizes the difficulties deriving from the presence of hydrogen fluoride in the effluent reaction gases and the importance of its elimination in a satisfactory industrially acceptable process for practicing the conversion of halogenated hydrocarbons to the fluorinated substitution products.

It is the principal object of the present invention, therefore, to provide an improved process for the production of fluorinated halocarbons (i.e., hydrocarbons containing chlorine, bromine and like halogens displaceable by fluorine from hydrogen fluoride) and especially polyfluorinated hydrocarbons of this character wherein the effluent gases at the conclusion of the process are not encumbered by the presence of hydrogen fluoride.

Yet another object of this invention is to provide an improved process of the character described wherein the hydrochloric acid resulting from the washing of the effluent gases will be substantially free from fluoride contamination.

Still another and more specific object of this invention is to provide a method of polyfluorinating halocarbons and especially chlorinated lower aliphatic hydrocarbons in an economical and efficient manner with a high yield of the higher fluorination products.

These objects, and others which will become apparent hereinafter, are based upon our discovery that the yield of higher fluorination products in a double-displacement reaction whereby chlorine atoms are exchanged for hydrogen atoms in a stream of hydrogen fluoride, in the presence of a suitable catalyst, can be markedly improved when the reaction is subdivided into a plurality (i.e., at least two and preferably more) of successive stages through which the chlorinated hydrocarbon is passed and which preferably are maintained at successively higher temperatures. The present concept requires that, at one or more subsequent stages of the reaction process, additional quantities of chlorinated hydrocarbon are supplied to the reaction mixture to increase the concentration of the chlorinated hydrocarbon after the reaction has consumed part of the originally supplied chlorinated hydrocarbon by conversion thereof to a fluorochloro compound.

It will be evident, therefore, that an increased conversion of the hydrogen fluoride to fluorochloro-hydrocarbons can be effected in this manner without, however, materially diluting the hydrogen fluoride initially present as would be required to obtain the same conversion in a one-stage process. It is evident that the advantages realized by our invention can be explained, in part, by the mass-action effect whereby it is generally necessary to increase significantly the proportion of chlorinated hydrocarbon with respect to the hydrogen fluoride if a high degree of conversion of the hydrogen fluoride is to be obtained. Such a technique, as described above, leads to dilution of the hydrogen fluoride and a decrease in the reaction rate in accordance with the laws of chemical and reactive kinetics. Pursuant to the present invention, the molar ratio of hydrogen fluoride to chlorinated hydrocarbon can be somewhat above 2:1 in accordance with stoichiometric requirements for the fluorination of a hydrocarbon containing multiple chlorine atoms (e.g., carbon tetrachloride). This reaction cannot, in practice, be brought to completion with total utilization of all of the hydrogen fluoride and frequently yields an effluent gas whose residual hydrogen fluoride can range from 1.5 to 15% by weight of the hydrogen fluoride originally present, for example. It is, therefore, the principal feature of the present invention that at least two and advantageously more successive stages are employed in a continuous-stream reaction, the stages being separated or provided in a single flow reactor, and the effluent gases containing residual hydrogen fluoride from an earlier stage are mixed with additional chlorine-containing hydrocarbon which is in stoichiometric excess over the amount necessary to at least monofluorinate the hydrocarbon; the effluent and additional hydrocarbon are passed into a subsequent reactor. The instant system thus provides a higher average molar ratio of chlorinated hydrocarbon to hydrogen fluoride over the entire process without resulting in the initial dilution of the hydrogen fluoride and a consequent decrease in the reaction rate. It has been found that the method of the present invention is particularly applicable to the production of higher-fluorinated hydrocarbons (i.e., polyfluorinated compounds such as dichlorodifluoromethane—Freon 12 and difluorochloromethane—Freon 22) which are of greatest economic and commercial value.

Since the displacement of a second chlorine atom of the hydrocarbon molecule by fluorine is a much slower reaction and requires higher energies than the displacement of the first chlorine atom, it is desirable to maintain the hydrogen fluoride concentration relatively high in order to displace the equilibrium toward the production of higher-fluorinated compounds. The instant method is, as indicated above, surprisingly effective on this score as well.

According to a more specific feature of the present invention, the nonfluorinated (unreacted) chlorinated hydrocarbons are separated from the effluent of the second or a subsequent stage and returned to the input end of the same or a preceding stage (other than the first one) to constitute part of the additional quantity of this hydrocarbon supplied for reaction with residual hydrogen fluoride from a still earlier stage. Similarly, the chlorinated hydrocarbon can be returned to the first stage where it constitutes a portion of the initial hydrocarbon component. Moreover, it has been found that the polyfluorination reaction can be made to predominate when lower fluorinated hydrocarbons (e.g., monofluorochloro hydrocarbons) are all returned to the first stage or any other previous stage upon separation from the effluent gas of the second or a subsequent stage. The separation of the nonfluorinated and lower-fluorinated hydrocarbons can be carried out by condensation in a conventional manner, preferentially with recycling to the first reaction stage. This step is particularly desirable since it can be carried out easily in practice by virtue of the fact that the higher-fluorinated hydrocarbons have much lower boiling points than the nonfluorinated or lower-fluorinated chlorocarbons; thus, by relatively simple fractional distillation or reflux condensation, compounds of the latter type can be recovered from the effluent gases and returned to the same or a previous stage, the latter being preferred.

As noted above, the reaction can be carried out in a single flow reactor at whose entrance side part of the chlorinated hydrocarbon to be fluorinated and hydrogen fluoride is introduced with, possibly, quantities of the lower-fluorinated hydrocarbon recovered from a subsequent stage. The flow reactor can be divided into at least two stages with the additional chlorinated hydrocarbon being introduced intermediate the two stages at, say, the central region of a two-stage flow reactor.

The invention can be carried out effectively in practice with fluorination of at least one halocarbon selected from the group consisting of carbon tetrachloride, chloroform, perchlorethylene or mixtures thereof and with the corresponding monofluorinated aliphatic compounds; the halocarbon-fluorination catalyst can be any of those employed heretofore for this purpose but is preferably an antimony fluorochloride whose formula can be represented as $$SbF_xCl_y$$

wherein $x$ and $y$ are empirically related and generally have a sum of about 5. The fluoride content of the catalyst should be of substantially 1–7%. The first-stage reaction takes place at a temperature between substantially 60 and 140° C. at a pressure of substantially 2–15 atmospheres (gauge) and yields a first effluent or reaction gas containing substantially 1–8% of unreacted or residual hydrogen fluoride. This gaseous effluent can then be passed into a second reactor or through the second stage of a single flow-type reactor whose reaction temperature is substantially 30–50° higher than that of the first stage in accordance with a more specific feature of this invention. The pressure in the second stage is essentially the same as that of the first while further quantities of the halogenated starting hydrocarbon are supplied. The effluent resulting from the second stage has a substantially reduced content of hydrogen fluoride which can be less than 0.1 in most circumstances. By the use of one or more reaction stages, the hydrogen fluoride content in the final gas mixture can be depressed still further. At the conclusion of the reaction or even at an intermediate stage, if desired, the nonreacted chlorinated hydrocarbons alone or together with the monofluorinated halocarbons are condensed in a reflux column and are returned to a preceding reactor while in the last reactor, which may be either continuous or discontinuous, in accordance with the invention, the concentration of chlorinated starting hydrocarbon is maintained at a higher level by addition of this hydrocarbon. While the hydrogen chloride can be separated from the effluent gas at any stage after the first (i.e., from the second-stage effluent or that of a subsequent stage), it is preferred to carry out the separation only at one of the latter stages so that only an insignificant quantity of hydrogen fluoride can be found in the aqueous solution of hydrogen chloride. Absorption of hydrogen chloride in water at a subsequent stage in the process yields a commercially acceptable hydrochloric acid at a concentration of 30–36% and with less than 0.1% by weight of hydrofluoric acid. The term aliphatic hydrocarbon as used herein is intended to refer to alkanes and alkenes having from 1 to 6 carbon atoms but preferably a carbon number of 1 to 3.

The above and other objects, features and advantages of the present invention will become more readily apparent from the following description and specific example, reference being made to the accompanying drawing wherein FIGS. 1, 2 and 3 are flow diagrams illustrating various embodiments of the instant process.

From FIG. 1, it will be seen that, at an initial stage I, hydrogen fluoride and carbon tetrachloride (representing polychlorinated halocarbons) are supplied at inlets 10 and 11. The reactor contains an antimony fluorochloro catalyst, as will be apparent hereinafter, and is maintained at a temperature between 60° and 140° C. with a pressure of 2 to 15 atmospheres (gauge). The gaseous effluent at 12 contains hydrogen chloride and the difluoro substitution product together with the monofluorinated product, residual hydrogen fluoride and unreacted carbon tetrachloride. This gaseous effluent is supplied to the second stage II whose catalyst can be the same as that of stage I but which is maintained at a temperature of 30° to 50° C. above that of stage I. At 13, sufficient carbon tetrachloride is added to provide a stoichiometric excess over that necessary for monofluorination and, preferably, polyfluorination by the residual hydrogen fluoride supplied by line 12. The gaseous effluent from stage II is led off as indicated by line 14 and contains a substantially reduced quantity of hydrogen fluoride. The sequence can be continued by feeding the effluent from stage II to a third stage III and, in turn, to a fourth stage IV via a line 15, subsequent stages being provided as desired. Additional quantities of carbon tetrachloride are supplied at 16, 17 to the reaction stages III and IV which are maintained at temperatures of 30° to 50° above that of the respective preceding stages. The final gaseous effluent, having an insignificant proportion of residual hydrogen fluoride, can be passed into an absorption tower 18 via line 19 whence the hydrogen chloride component is removed and recovered as 30 to 36% aqueous hydrochloric acid of high commercial utility and exceptionally low fluoride content.

The hydrocarbons of the effluent from the last reaction stage include mono- and polyfluorinated hydrocarbons as well as the unreacted chlorinated hydrocarbon and are led from the absorber 18 via line 20 to a reflux separator 21 or the like. The polyfluorinated hydrocarbon is recovered at 22 while the monofluorinated product can be led via line 23 to one of the earlier stages (e.g., the first or second stage, as indicated in the FIGURE 1) whereas the carbon tetrachloride at 24 can be resupplied at any stage as part of the additional quantity of carbon tetrachloride required in stages subsequent to stage I. Should high-quality hydrochloric acid not be required, the effluent can be removed at any stage and passed through a respective absorber 25, 26 and reflux separator 27, 28 with recycling of the monofluorinated and unfluorinated hydrocarbons. Lino 30 represents the return of carbon tetrachloride from a subsequent stage to an earlier stage, preferably stage I, to constitute part of the chlorinated starting hydrocarbon.

In FIG. 2 we have shown a diagram illustrating a simplified form of the process. In this diagram the lines for the flow of the reagents and the reaction products, the absorber and the separator are indicated by the same numbers as are the corresponding parts in FIG. 1. The gaseous effluent from stage I is supplied to a single second stage IV. Additional carbon tetrachloride is added to the second stage IV at 17 and the gaseous effluent from stage IV is led off as indicated by line 19 to the separator 21. The polyfluorinated hydrocarbon together with the hydrogen chloride flows at 22 to the absorber 18 and is recovered therefrom besides the 30 to 36% aqueous hydrochloric acid which is recovered by this simplified process with a very low fluoride content and with commercial utility. The separated carbon tetrachloride and monofluorinated hydrocarbons are recycled to stage I in case it is desired to produce especially the polyfluorinated hydrocarbons. In the event that mixtures of the mono- and polyfluorinated hydrocarbons are wanted, only the carbon tetrachloride is separated and the monofluorinated hydrocarbons are led to the absorber. It is possible to feed the separated carbon tetrachloride to stage I or to stage IV. It is to be noted that many variations of this system are possible without leaving the scope of the invention.

FIG. 3 shows the diagram of a preferred form of the process. It is very similar to that of FIG. 2. The only difference consists in the interposition of additional stages, i.e. the same stages II and III as in FIG. 1.

EXAMPLE

Carbon tetrachloride and hydrogen fluoride in a molar rtaio of 65 mole percent hydrogen fluoride and 35 mole percent carbon tetrachloride are continuously passed into the first stage of a reactor containing an antimony fluorochloride catalyst. The catalyst was prepared by introducing hydrogen fluoride into a mixture of 90% by weight of antimony pentachloride and 10% by weight of antimony trichloride at a temperature of 120° to 140° C. until the fluoride content of the catalyst ranged from 1 to 7% by weight. The quantity of catalyst in the first stage is so chosen that its weight equals four times the weight of the carbon tetrachloride/hydrogen fluoride mixture passed through the first stage in an hour. In general, it has been found advantageous to make the quantity of catalyst in an earlier stage equal to at least several times the mass of the gaseous mixture passing therethrough in an hour while the quantity of catalyst in the second stage is less and can be substantially equal in weight to that of the gases flowing through the subsequent stage. This ratio of catalyst mass to hourly mass flow of the gas is a measure of the contact time. The temperature in the first-stage reactor is maintained at 80° C. while the pressure is held at 8 atmospheres (gauge). The gaseous mixture flowing from the first stage, i.e., the first gaseous effluent, consists essentially of 5 mole percent hydrogen chloride, 24 mole percent difluorodichloromethane and 10 mole percent monofluorotrichloromethane, 6 mole percent hydrogen fluoride and 1 mole percent carbon tetrachloride.

This effluent is passed into the second-stage reactor at a temperature about 30° C. higher than that of the first reactor. The quantity of catalyst, calculated as above in accordance with the hourly mass flow of gases through the reactor, is half of that used in the first reactor. The second reactor is initially supplied with carbon tetrachloride in such quantity that, with feeding of additional carbon tetrachloride during the reaction, the weight ratio between catalyst and carbon tetrachloride in the second reactor is maintained at substantially 1:1. The second effluent consists essentially of 61 mole percent hydrogen chloride, 23.7 mole percent difluorodichloromethane, 14 mole percent monofluorotrifluoromethane, 1 mole percent carbon tetrachloride and 0.3 mole percent hydrogen fluoride. When a third stage is employed, the hydrogen fluoride content can be reduced to less than 0.1 mole percent. The monofluoro compound is separated from the difluoro compound and continuously supplied to the first-stage reactor in place of an equimolar amount of starting carbon tetrachloride. After the process has continued for some time, the molar proportion of the polyfluorinated compound is found to have increased. The carbon tetrachloride separated from the second effluent is returned to the second stage as part of the additional carbon tetrachloride or to the first stage as part of the starting material.

We claim:
1. A process for the production of fluorinated aliphatic hydrocarbons, comprising the steps of:
(a) passing in a first reaction stage a gaseous mixture of at least one chlorinated lower aliphatic hydrocarbon selected from the group which consists of carbon tetrachloride, chloroform and perchlorethylene and hydrogen fluoride over a halocarbon-fluorination catalyst at a temperature between 60° and 140° C., under a pressure between 2 and 15 atmospheres gauge, and for a contact time sufficient to effect displacement of at least part of the chlorine of said chlorinated hydrocarbon by fluorine from said hydrogen fluoride to produce a first gaseous effluent containing substantial proportions of at least one fluorinated hydrocarbon, unreacted hydrogen fluoride and hydrogen chloride;
(b) reacting substantially all of said unreacted hydrogen fluoride by passing said first gaseous effluent subsequently over a further fluorination catalyst together with an additional quantity of said chlorinated hydrocarbon in stoichiometric excess above that required to monofluorinate said additional quantity of chlorinated hydrocarbon with said unreacted hydrogen fluoride in a second reaction stage and at a temperature exceeding that of said first stage by 30° to 50° C., under substantially the pressure of said first stage and for a contact time sufficient to effect fluorination of fluorinatable components of said first effluent and part of said additional quantity of chlorinated hydrocarbon with said unreacted hydrogen fluoride to produce a second gaseous effluent con- sisting essentially of hydrogen chloride, fluorinated hydrocarbons and excess chlorinated hydrocarbon, with a negligible residue of hydrogen fluoride; and (c) separating the fluoro-hydrocarbons from the hydrogen chloride of said second effluent.

2. A process for the production of aliphatic fluorochloro-hydrocarbons, comprising the steps of:

(a) passing in a first reaction stage a gaseous mixture of at least one chlorine-containing lower aliphatic hydrocarbon, selected from the group which consists of carbon tetrachloride, chloroform and perchlorethylene, and hydrogen fluoride over a halocarbon-fluorination catalyst at a temperature between 60° and 140° C., under a pressure between 2 and 15 atmospheres gauge, and for a contact time sufficient to effect displacement of at least part of the chlorine of said chlorinated hydrocarbon by fluorine from said hydrogen fluoride to produce a first gaseous effluent containing substantial proportions of at least one fluorochlorinated hydrocarbon, unreacted hydrogen fluoride and hydrogen chloride;

(b) passing said first gaseous effluent subsequently over a further fluorination catalyst together with an additional quantity of said chlorinated hydrocarbon in stoichiometric excess above that required to monofluorinate said additional quantity of chlorinated hydrocarbon with said unreacted hydrogen fluoride in a second reaction stage and at a temperature, exceeding that of said first stage by 30° to 50° C., under substantially the pressure of said first stage and for a contact time sufficient to effect fluorination of fluorinatable components of said first effluent and part of said additional quantity of chlorinated hydrocarbon with said unreacted hydrogen fluoride to produce a second gaseous effluent consisting essentially of hydrogen chloride fluorochlorinated hydrocarbons including at least one lower-fluorinated and at least one higher-fluorinated compound and excess chlorinated hydrocarbon, with a negligible residue of hydrogen fluoride; and (c) separating the fluorochlorinated hydrocarbons from the hydrogen chloride of said second effluent; and (d) after returning from said second effluent said lower-fluorinated compound to one of said stages for subsequent fluorination to increase the fluorine number thereof.

3. A process for the production of fluorinated aliphatic hydrocarbons, comprising the steps of:

(a) passing a gaseous mixture of carbon tetrachloride and hydrogen fluoride in succession through several reaction stages at a pressure between 2 and 15 atmospheres gauge and progressively higher temperatures, with the temperature of the first stage between 60° and 140° C. and with the temperature of each subsequent stage exceeding that of its predecessor stage by 30° to 50° C., over a halocarbon-fluoridation catalyst for a sufficient contact time to obtain at the final stage a gaseous effluent consisting essentially of hydrogen chloride, monofluorotrichloromethane, difluorodichloromethane and residual unreacted hydrogen fluoride;

(b) supplying a sufficient quantity of additional carbon tetrachloride to at least said final stage to reduce the quantity of said residual hydrogen fluoride to a fraction of one mole-percent; and (c) separating the hydrogen chloride together with said residual hydrogen fluoride from the fluorinated hydrocarbons and the excess carbon tetrachloride of said effluent.

4. The process defined in claim 3 wherein the catalyst in each of said stages is an antimony fluorochloride and the quantity of said catalyst in the first stage is present in an amount, by weight, equal to at least several times the mass of the mixture passing therethrough in one hour while the quantity of said catalyst in the second stage is substantially equal to half that of said first stage.

5. The process defined in claim 3 wherein said hydrogen chloride is separated from said effluent by washing the latter with water to produce an aqueous solution of hydrogen chloride substantially free from hydrogen fluoride.

6. The process defined in claim 3 wherein said excess carbon tetrachloride from said effluent in step (c) is recycled as part of said quantity of additional carbon tetrachloride.

7. The process defined in claim 3 wherein the monofluorotrichloromethane of said effluent is separated from the difluorodichloromethane and recycled to at least one stage other than said final stage for further fluorination.

References Cited

UNITED STATES PATENTS

| | | | |
|---|---|---|---|
| 2,024,095 | 12/1935 | Daudt et al. | 260—653.7 |
| 2,407,129 | 1/1946 | Benning et al. | 260—653.7 |
| 2,458,551 | 1/1949 | Benning et al. | 260—653.7 |
| 2,478,362 | 8/1949 | Benning | 260—653.7 |
| 2,946,827 | 7/1960 | Belf | 260—653.7 |

DANIEL D. HORWITZ, *Primary Examiner.*

LEON ZITVER, *Examiner.*